May 16, 1939.  N. J. ALEXANDER  2,158,316
HITCH
Filed July 9, 1938
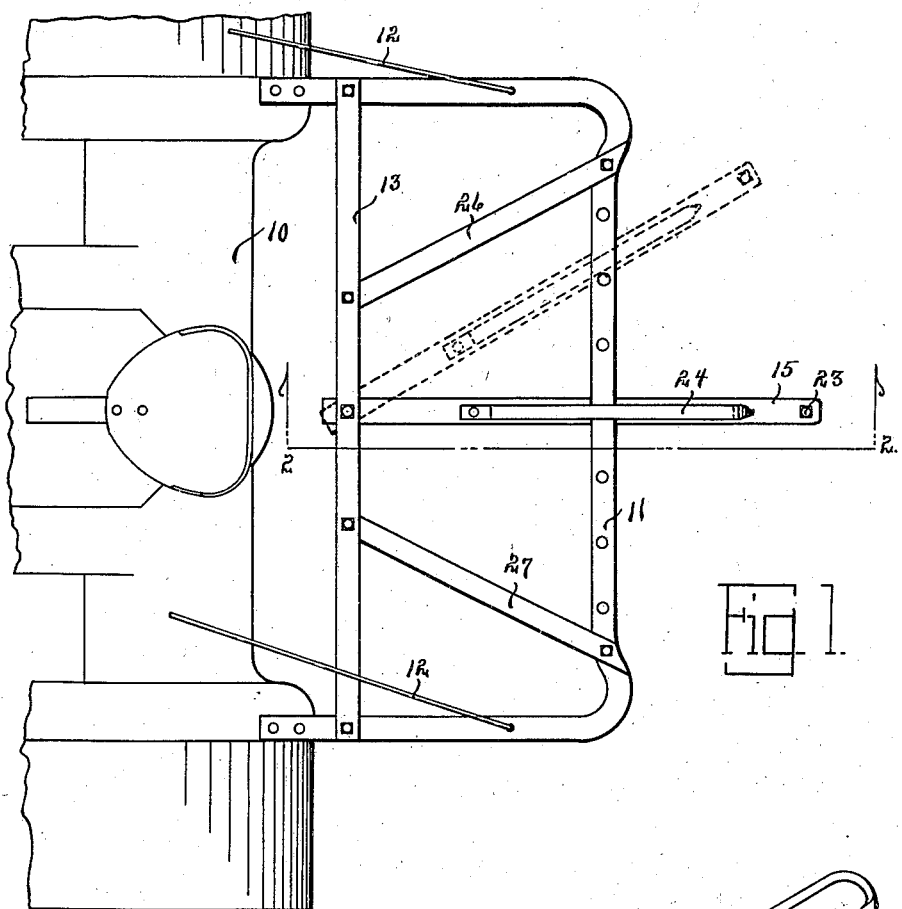
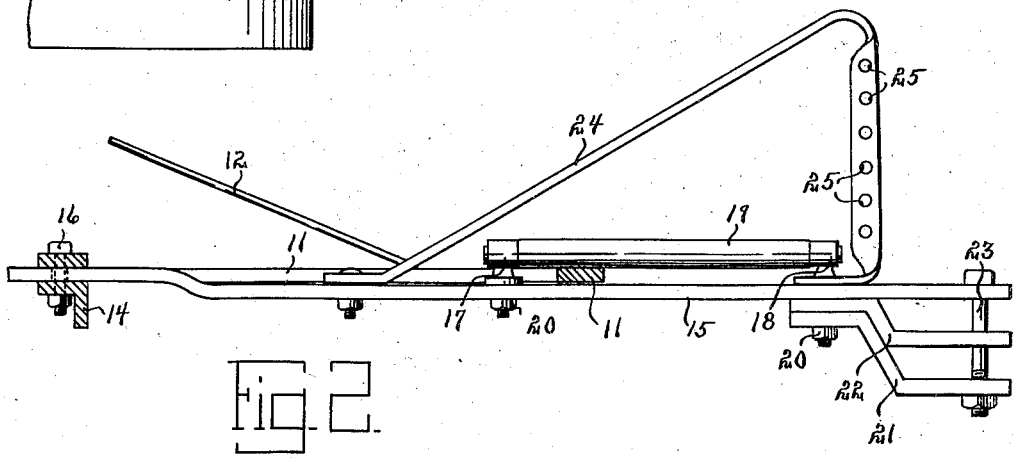
INVENTOR.
N. J. ALEXANDER
BY M. Talbert Dick
ATTORNEY.

Patented May 16, 1939

2,158,316

UNITED STATES PATENT OFFICE 2,158,316

HITCH

Norris J. Alexander, Algona, Iowa

Application July 9, 1938, Serial No. 218,369

1 Claim. (Cl. 280—33.44)

The principal object of my invention is to provide a hitch for tractors and the like that has a roller swinging connection between the pulling apparatus and the device being pulled.

A further object of my invention is to provide a swinging hitch that operates easily and efficiently regardless of the load pulled or relative conditions between the tractor or like and the device being pulled.

A still further object of my invention is to provide a hitch that may be easily and quickly attached to or detached from a tractor or like.

A still further object of my invention is to provide a tractor or like hitch that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claim and illustrated in the accompanying drawing, in which:

Fig. 1 is a top plan view of my hitch secured to a tractor and ready for use.

Fig. 2 is a side view of my device taken on line 2—2 of Fig. 1 and more fully illustrates its construction.

Tractors are universally used for plowing, cultivating and the like, but considerable difficulty is experienced during the turning movement. Most of these tractors have rigid non-movable hitches and those that do have swinging hitches, the swing is very limited and the operation is not easily and smoothly obtained. I have overcome such objections by providing an easily operated, swinging hitch that has a maximum of swinging action and one that provides certain safety features.

Referring to the drawing, I have used the numeral 10 to designate a tractor. The numeral 11 designates a horizontally positioned flat U-shaped bar as shown in the drawing. This U-shaped bar may be secured to the tractor in any suitable manner and has place rods 12. The numeral 13 designates a cross bar having one end secured by suitable means to one end portion of the member 11 and its other end secured by suitable means to the other end portion of the member 11. The numeral 14 designates a cross angle bar directly below the bar 13 and also having its two ends secured to the two end portions of the member 11 respectively. These two cross bars 13 and 14 are slightly spaced apart as shown in Fig. 2. The numeral 15 designates a bar having its forward end rotatably secured to the centers of the lengths of the cross bars 13 and 14 by any suitable means such as a bolt 16. The forward end of this bar 15 extends between the two cross bars 13 and 14 and is then slidably bent to extend rearwardly and directly below the center portion of the U-bar 11. The numeral 17 designates a bearing member secured to the horizontal bar 14 and positioned forward of the center portions of the member 11. The numeral 18 designates a bearing member secured to the bar 15 and positioned to the rear of the center portion of the member 11. These two bearing members 17 and 18 are positioned on the upper surface of the rear end portion of the bar 15. The numeral 19 designates an elongated roller extending directly above the center portion of the member 11 having one end rotatably mounted in the bearing member 17 and its other end rotatably mounted in the bearing member 18. By this construction, the central portion of the member 11 will extend loosely between the elongated roller 19 and the upper rear surface of the bar 15. The bearing member 17 and 18 may be detachably secured to the bar 15 by bolts 20. The numerals 21 and 22 designate two rearwardly extending members secured to the bottom rear end of the bar 15 to form with the bar 15 and the bolts pin 23 two clevises. By this arrangement as shown in Fig. 2, one clevis connection will be directly above the other and the implement or device to be pulled by the hitch is selectively secured by the pin 23 between the rear end of the bar 15 and the member 22 or between the member 22 and member 21. Obviously certain devices to be pulled will necessitate their being secured at a higher or lower elevation than other devices and this construction provides two different elevation connections. Obviously additional members similar to 21 and 22 may be secured to the rear end of the bar 15 for giving additional connection. The numeral 24 designates a bar having its front end rigidly secured to the bar 15 at a point forwardly of the bar member 17 and its rear end secured to the rear end portion of the bar 15 as shown in Fig. 2. This member extends rearwardly and upwardly and then downwardly. The numeral 25 designates a plurality of vertically arranged holes in the downwardly extending portion of the member 24. Certain devices to be pulled require a higher hitch and they may be secured selectively through any one of the spaced apart holes 25. An illustration of such a device to be pulled is an earth conditioning harrow. The numeral 26 designates a brace bar having its forward end secured to the bars 13 and 14 and its other end secured to the right side portion of the member 11. This brace bar 26 extends rearwardly and to the right. The numeral 27 designates a similar brace bar having its forward end secured to the cross bars 13 and 14 and its rear end secured to the left side portion of the member 11. This bar extends rearwardly and to the left. As shown in Fig. 1, the bar 15 has swinging movement to the right and to the left between these two brace bars 26 and 27. These brace bars 26 and 27 act as stops for the swinging action of the bar 15, thereby providing a safety swinging limit to the bar 15. These brace bars 26 and 27 also strengthen the entire device. As the pulled load is usually rearwardly and downwardly, the elongated roller 19 will engage the upper surface of the member 11 and because of the rolling action therein provided, the bar 15 may easily move to the right or left with the minimum amount of friction resistance. Although I have described my device as particularly adapted for tractor use, it may be used on any pulling vehicle where the swinging hitch is desired.

Some changes may be made in the construction and arrangement of my improved hitch without departing from the real spirit and purpose of my invention, and it is my intention to cover by my claim any modified forms of structure or use of mechanical equivalents which may be reasonably included within its scope.

I claim:

In a device of the class described, a U-shaped member designed to be secured to a pulling vehicle, a cross bar on said U-shaped member, a bar pivoted at its forward end to the center of said cross bar and extending past the center portion and underneath said U-shaped member, an elongated roller rotatably mounted on said bar and engaging the upper surface of the center portion of said U-shaped member, a member secured to the upper side of said bar extending upwardly and rearwardly of said roller and having therein a plurality of vertically arranged holes, and brace members extending from said cross bar to said U-shaped member for bracing said cross bar and for providing a limiting means for limiting the action of said bar on said U-shaped member.

NORRIS J. ALEXANDER.